US011169170B2

(12) United States Patent
Liu

(10) Patent No.: US 11,169,170 B2
(45) Date of Patent: Nov. 9, 2021

(54) SPEED DETECTION DEVICE OF HANDRAIL OF PASSENGER CONVEYOR AND A SPEED DETECTION METHOD THEREOF

(71) Applicant: Otis Elevator Company, Farmington, CT (US)

(72) Inventor: Honglin Liu, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 835 days.

(21) Appl. No.: 15/957,412

(22) Filed: Apr. 19, 2018

(65) Prior Publication Data
US 2018/0306832 A1    Oct. 25, 2018

(30) Foreign Application Priority Data

Apr. 19, 2017 (CN) .......................... 201710256230.8

(51) Int. Cl.
*G01P 3/38* (2006.01)
*B66B 23/24* (2006.01)
*B66B 27/00* (2006.01)
*B66B 25/00* (2006.01)

(52) U.S. Cl.
CPC ................ *G01P 3/38* (2013.01); *B66B 23/24* (2013.01); *B66B 25/006* (2013.01); *B66B 27/00* (2013.01)

(58) Field of Classification Search
CPC ......... B66B 23/24; B66B 27/00; B66B 23/26; B66B 25/003; B66B 25/00; G01P 3/38
USPC ........................................ 198/322, 323, 331
See application file for complete search history.

(56) References Cited

U.S. PATENT DOCUMENTS

| 5,072,820 | A | | 12/1991 | Steffen et al. |
| 5,099,977 | A | * | 3/1992 | Hirose .................... B66B 23/02 198/323 |
| 5,645,156 | A | | 7/1997 | Zaharia et al. |
| 6,015,038 | A | | 1/2000 | Stoexen et al. |
| 6,112,166 | A | * | 8/2000 | Joosten ................... B66B 27/00 198/323 |

(Continued)

FOREIGN PATENT DOCUMENTS

| CN | 1591020 A | 3/2005 |
| CN | 1987484 A | 6/2007 |

(Continued)

OTHER PUBLICATIONS

Kone, "Escalators: Safety and Performance Upgrades", 2012, Kone Inc., 8 pages.

(Continued)

*Primary Examiner* — James R Bidwell
(74) *Attorney, Agent, or Firm* — Cantor Colburn LLP

(57) ABSTRACT

The present invention provides a speed detection device and a speed detection method for a handrail of a passenger conveyor, and belongs to the technical field of passenger conveyors. A distance from the speed detection device provided by the present invention to a surface of a detected handrail is centimeter-scale or below centimeter-scale, wherein the speed detection device comprises a light source part, an imaging sensor and an image processing part. The speed detection device and the speed detection method provided by the present invention can accurately detect to obtain speed information of the running handrail, and the speed detection device is easy to install and maintain.

18 Claims, 3 Drawing Sheets

(56) References Cited

U.S. PATENT DOCUMENTS

| | | | |
|---|---|---|---|
| 10,364,130 B2 * | 7/2019 | Chen ..................... | B66B 25/006 |
| 2006/0171725 A1 | 8/2006 | Ruthenberg et al. | |
| 2015/0129745 A1 * | 5/2015 | Smith ..................... | G01S 17/58 |
| | | | 250/206 |

FOREIGN PATENT DOCUMENTS

| | | | | |
|---|---|---|---|---|
| CN | 102442604 A | | 5/2012 | |
| CN | 202609747 U | | 12/2012 | |
| CN | 203284028 U | | 11/2013 | |
| CN | 203497911 U | | 3/2014 | |
| CN | 104276503 A | | 1/2015 | |
| CN | 103241634 B | | 2/2015 | |
| CN | 204138118 U | | 2/2015 | |
| CN | 102838034 B | | 4/2015 | |
| CN | 204265206 U | | 4/2015 | |
| DE | 10141412 A1 | | 3/2003 | |
| JP | 5-246676 | * | 9/1993 | ............. B66B 23/24 |
| JP | 2004361328 A | | 12/2004 | |

OTHER PUBLICATIONS

European Search Report for application EP 18168342.6, dated Oct. 24, 2018, 6 pages.

Tang, Yuelin, "A Design and Realization of Escalator Handrail Speed Tolerance Measurement Based on ARM Cotex-M4", Chongqing Special Equipment Inspection and Research Institute, Chongqing 401121, CN, ISSN: 1662-7482, vols. 530-531, Feb. 27, 2014, 93-96 pages.

Chinese Office Action for CN 201710256230.8, dated Apr. 1, 2020, 8 pages.

* cited by examiner

SPEED DETECTION DEVICE OF HANDRAIL OF PASSENGER CONVEYOR AND A SPEED DETECTION METHOD THEREOF

FOREIGN PRIORITY

This application claims priority to Chinese Patent Application No. 201710256230.8, filed Apr. 19, 2017, and all the benefits accruing therefrom under 35 U.S.C. § 119, the contents of which in its entirety are herein incorporated by reference.

TECHNICAL FIELD

The present invention belongs to the technical field of passenger conveyors and relates to automatic detection of speed of a handrail of a passenger conveyor.

BACKGROUND ART

Passenger conveyors (such as escalators and moving walkways) are increasingly widely applied at public places such as subways, shopping malls and airports, and the safety of running thereof is increasingly important. In order to guarantee the normal running of the passenger conveyors, one important aspect is to detect the running speed of handrails of the passenger conveyors in real time and find speed abnormalities (such as speed abnormalities caused by reverse running and hand pinching) in time.

Current speed detection devices for handrails of passenger conveyors are realized by detecting running speed of rollers which drive handrails to move. Therefore, such speed detection devices inevitably are installed inside passenger conveyors and have the problem of difficult installation and maintenance; and since the speed of the handrails are not directly detected, the problem that the detected speed is not accurate is easily caused, e.g., when sliding occurs between the rollers and the handrails, the detected speed cannot genuinely reflect the speed of the handrails.

SUMMARY OF THE INVENTION

According to one aspect of the present invention, the present invention provides a speed detection device for a handrail of a passenger conveyor, and a distance from the speed detection device to a surface of the detected handrail is centimeter-scale or below centimeter-scale, wherein the speed detection device comprises: a light source part used for emitting light to the surface of the handrail; an imaging sensor used for sensing the local surface of the handrail to acquire an image sequence frame; and an image processing part used for analyzing and processing the image sequence frame to obtain speed information of the handrail.

According to another aspect of the present invention, the present invention provides a speed detection method using a speed detection device for a handrail of a passenger conveyor, the method comprising the following steps: when light is emitted to a surface of the handrail from a short distance, sensing the local surface of the handrail from a short distance to acquire an image sequence frame, wherein the short distance refers to that a distance to the surface of the detected handrail is centimeter-scale or below centimeter-scale; and analyzing and processing the image sequence frame to obtain speed information of the handrail.

According to another aspect of the present invention, the present invention provides a passenger conveyor, comprising: handrails; and the speed detection devices used for performing speed detection to the handrails.

The above-mentioned features and operations of the present invention will become more obvious according to the following description and drawings.

BRIEF DESCRIPTION OF THE DRAWINGS

The following detailed description with reference to the drawings will enable the above-mentioned and other purposes and advantages of the present invention to be more complete and clearer, wherein the same or similar elements are expressed by using the same reference signs.

DETAILED DESCRIPTION

Figure 1:
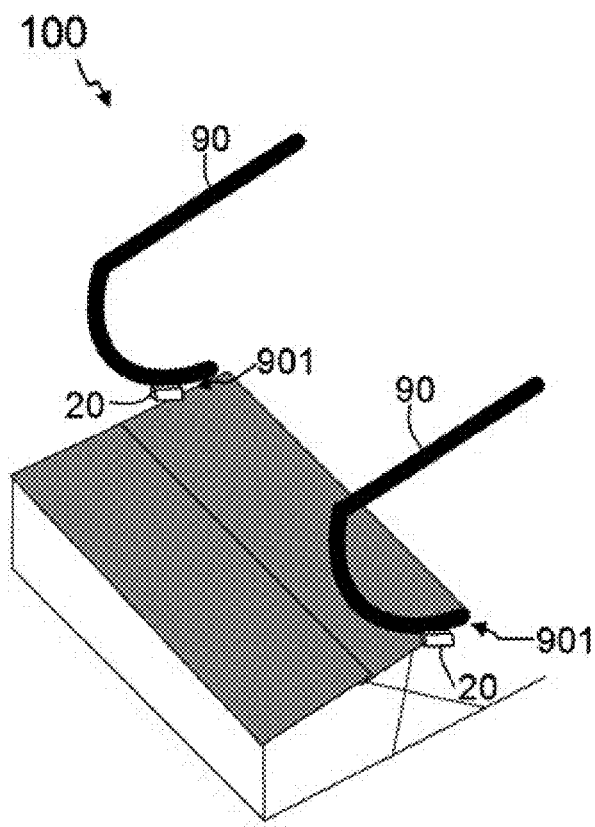
FIG. 1 illustrates a partial structural schematic diagram of a passenger conveyor according to one embodiment of the present invention.

The present invention will be more fully described with reference to the drawings, in which exemplary embodiments of the present invention are illustrated. However, the present invention may be implemented by many different means and shall not be understood as limited to the embodiments described here. Contrarily, providing these embodiments enables the present disclosure to become thorough and compact and fully conveys the concept of the present invention to one skilled in the art.

Some block diagrams in the drawings are functional entities and do not certainly correspond to physically or logically independent entities. These functional entities may be realized by means of software, or these functional entities may be realized in one or more hardware modules or integrated circuits, or these functional entities may be realized in different processing devices and/or microcontroller devices.

Figure 2:
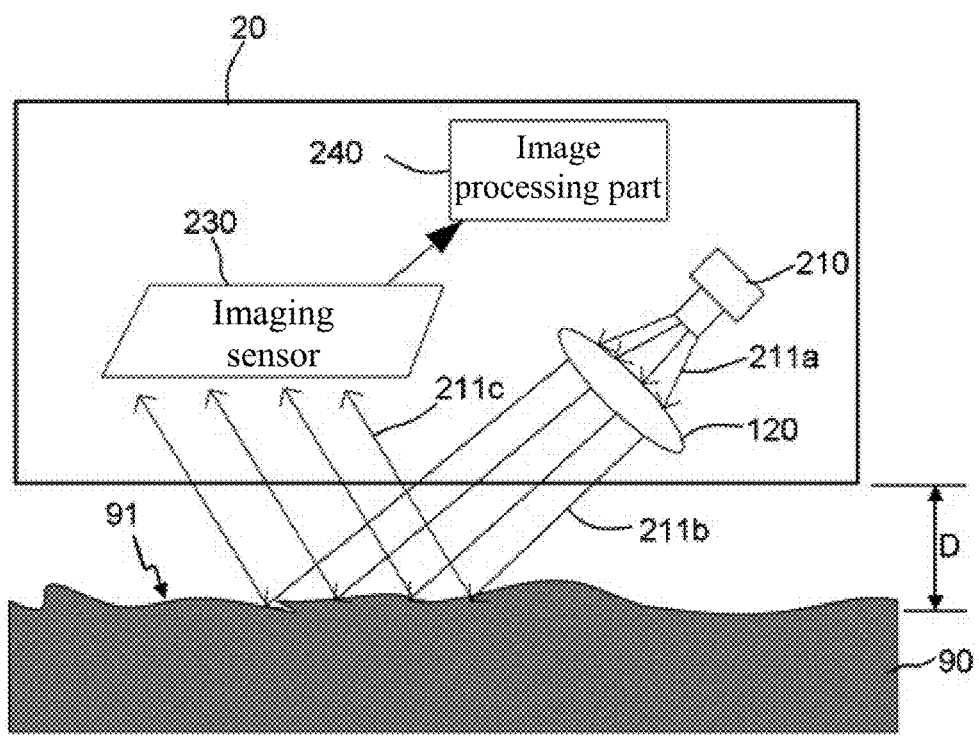
FIG. 2 illustrates a structural schematic diagram of a speed detection device for a handrail of a passenger conveyor according to one embodiment of the present invention.

FIG. 1 illustrates a partial structural schematic diagram of a passenger conveyor according to one embodiment of the present invention and FIG. 2 illustrates a structural schematic diagram of a speed detection device for a handrail of a passenger conveyor according to one embodiment of the present invention. The passenger conveyor 10 and the speed detection device 20 provided by the embodiments of the present invention will be exemplarily described below with reference to FIG. 1 and FIG. 2.

As illustrated in FIG. 1 and FIG. 2, the passenger conveyor 10 provided by the embodiment of the present invention are installed with the speed detection devices 20 used for detecting speed of handrails 90. Specifically, each of a left handrail and a right handrail is correspondingly installed with the speed detection device 20. The volume of the speed detection device 20 is relatively small, e.g., the size is even smaller than the width of the handrail 90. In one embodiment, the speed detection device 20 may be fixedly installed at a handrail entrance 901 of the passenger conveyor, such that speed detection is not easily influenced by a running environment and the running and attractiveness of the passenger conveyor 10 are not influenced.

Passenger conveyors 10 specifically include escalators and moving walkways and specific types thereof are not restrictive. It shall be understood that any passenger conveyor 10 with moving handrails can use the speed detection device 20 provided by the present invention.

As illustrated in FIG. 2, the speed detection device 20 is schematically used for detecting speed of the handrail 90 and mainly comprises a light source part 210, an imaging sensor 230 and an image processing part 240. Herein, when the speed detection device 20 is installed, a distance D from the speed detection device 20 to a surface 91 of the detected handrail 90 is controlled to be centimeter-scale or below centimeter-scale. In one embodiment, the distance D is greater than or equal to 5 mm and is smaller than or equal to 3 cm, e.g., D=1 cm or 2 cm.

Continuously as illustrated in FIG. 2, under the situation that the speed detection device 20 is installed at a short distance to the surface 91 of the detected handrail 90, the light source part 210 may be used for emitting light 211 to the surface 91 of the handrail 90, such that the imaging sensor 230 can clearly image the surface 91 of the moving handrail 90 and the accurate of speed detection is improved. The light source part 210 specifically may be an LED (Light-Emitting Diode), the light 211 emitted thereby can be sensed by the imaging sensor 230, and thus light 211c reflected from the surface 91 of the handrail 90 can be used for imaging. It needs to be understood that, under the situation that the imaging sensor 230 can sense, the specific type of the light source part 210 is not restrictive. For example, it may be a laser source; and for another example, it may be an infrared light source which emits nonvisible light.

In one embodiment, in the speed detection device 20, a light guide part 220 is further configured corresponding to the light source part 210; and this is because the light 211a emitted by the light source part 210 (such as LED) is relatively scattered, the light which irradiates the surface 91 of the handrail 90 is relatively less and is not centralized, and consequently it is relatively difficult for the image sensor 230 to image clearly. By introducing the light guide part 220, path guiding may be performed to the light 211a emitted by the light source part 210 to form light 211b which irradiates the surface 91 of the handrail 90 approximately in parallel, the light 211b relative to the light 211a can more intensively irradiate a certain point or a certain area on the surface 91 of the handrail 90, more light 211c reflected by the surface 91 of the handrail 90 is sensed by the imaging sensor 230, and the acquisition of clear image sequence frame is facilitated, especially under various different environmental light conditions.

Specifically, the light guide part 220 specifically may be realized through one or more prisms or lenses, and the specific type thereof is not restrictive.

Continuously as illustrated in FIG. 2, the imaging sensor 230 is used for sensing the local surface 91 of the handrail 90 to acquire the image sequence frame 231; the imaging sensor 230 can continuously sense the local surface 91 of the handrail 90 according to frequency, so as to acquire the image sequence frame 231; and the image sequence frame 231 is used for calculating speed information of the handrail 90. In one embodiment, the frequency that the imaging sensor 230 acquires the image sequence frame 231 is greater than the vibrating frequency of the handrail 90, specifically the frequency that the imaging sensor 230 acquires the image sequence frame 231 is 30 Hz-9,000 Hz (e.g., 500 Hz, 1,000 Hz or 2,000 Hz), thus the time interval between adjacent image frames 231 is comparatively small, the shift of feature points P in the adjacent image frames 231 caused by vibration of the handrail 90 of the imaging sensor 230 is smaller relative to the shift of the feature points P in the adjacent image frames 231 caused by movement of the handrail 90 or even can be neglected, and the accuracy of speed calculation is improved.

Specifically, the imaging sensor 230 may be a Charge Coupled Device (CCD) imaging sensor or a Complementary Metal-Oxide Semiconductor (CMOS), and the specific type thereof is not restrictive and can be selected and arranged according to the light source part 210.

Continuously as illustrated in FIG. 2, the image processing part 240 is used for analyzing and processing the image sequence frame 231 to obtain speed information of the handrail 90, and the obtained speed information can substantially reflect the current running speed of the handrail 90 in real time. The image processing part 240 specifically may be realized by, but not limited to a graphics processor, and can be integrally or separately arranged relative to the imaging sensor 230.

It needs to be stated that, since the speed detection device 20 is installed at a short distance to the surface of 91 of the detected handrail 90, imaging detection is only performed to a local area of the surface 91 of the handrail 90, the imaging sensor 230 can relatively and clearly acquire the image of the surface 91 of the handrail 90 from a short distance under a situation that the light source part 210 is correspondingly configured, and in the image processing process, not only is the image processing process simple, but also the speed information which can accurately reflect the current running speed of the handrail 90 can be obtained.

It needs to be stated that, in the present invention, the speed information is not limited to refer to the actual running speed of the handrail 90. Moreover, in other words, the expression mode of the speed information is not restrictive, and information which reflects the running speed of the handrail 90 in any expression mode is "speed information" referred to by the present invention.

Figure 3:
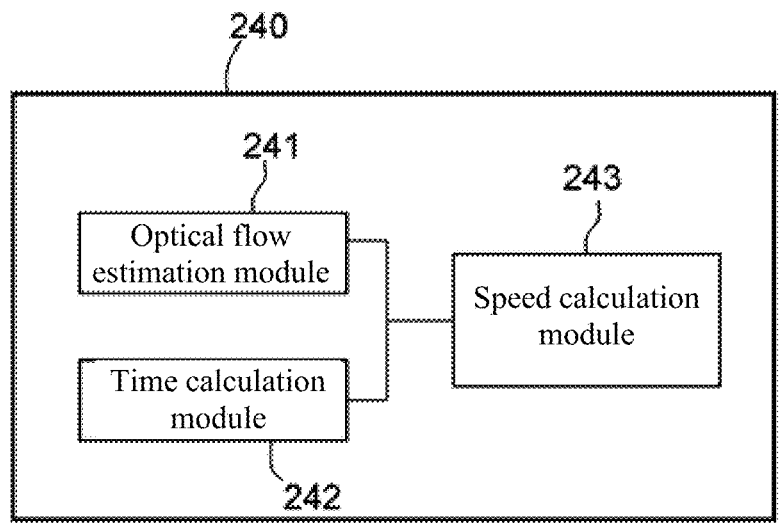
FIG. 3 illustrates a modular structural schematic diagram of an image processing part of the speed detection device illustrated in FIG. 2.
Figure 4:
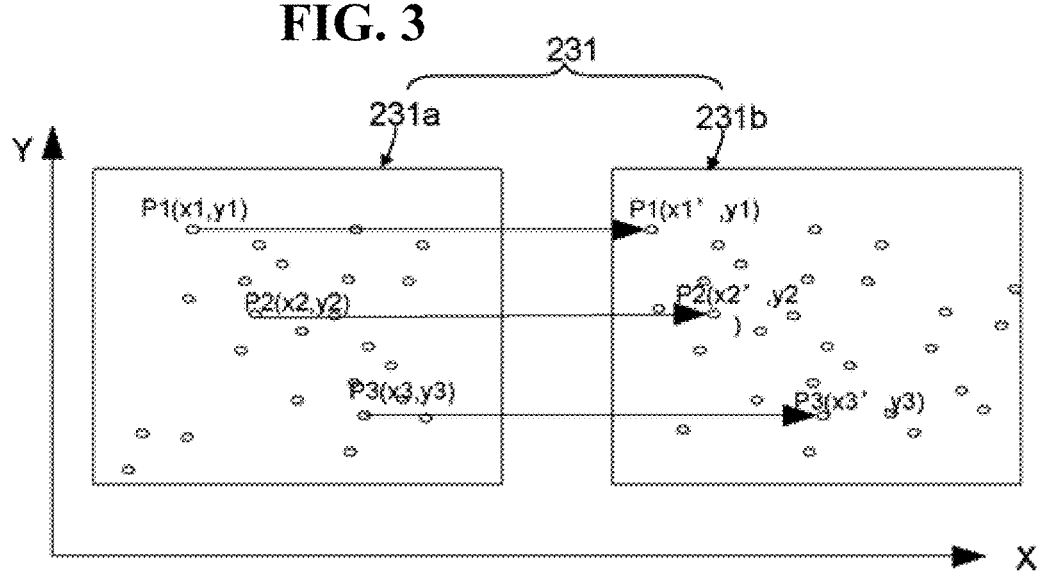
FIG. 4 illustrates a schematic diagram of calculating a shift of a corresponding feature point P between adjacent image frames under frame coordinates.

FIG. 3 illustrates a modular structural schematic diagram of an image processing part 240 of the speed detection device 20 illustrated in FIG. 2, and FIG. 4 illustrates a schematic diagram of calculating a shift of a corresponding feature point P between adjacent image frames 231a and 231b under frame coordinates. In combination with FIG. 2 to FIG. 4, in one embodiment, the imaging sensor 230 is used for analyzing and processing the image sequence frame 231 to obtain a shift of a corresponding feature point P (such as P1, P2 and P3) between adjacent image frames 231a and 231b under frame coordinates, so as to obtain the speed information of the handrail 90; and specifically, the imaging sensor 230 comprises an optical flow estimation module 241, a time calculation module 242 and a speed calculation module 243.

Herein, the optical flow estimation module 241 is used for calculating a shift of a corresponding feature point P between adjacent image frames 231a and 231b in the image sequence frame 231 under frame coordinates based on an optical flow method. It needs to be stated that the type of the optical flow method specifically applied here is not restrictive; and words "adjacent frames" shall be understood as two frames used for calculating optical flow between frames.

By taking a plurality of image sequence frames 231 acquired by the imaging sensor 230 as an example, for example, they are tens to hundreds of image frames 231 acquired per second, wherein pixels of each image frame 231 have a corresponding gray value; and if the imaging sensor can acquire color information, pixels of each image frame further have corresponding color information. When speed detection is performed to the handrail 90, a plurality of points of images corresponding to the surface of the handrail 91 may be used as feature points; specifically, pixel points or tiny areas with significantly different gray distribution in moving step images may be used as feature points P; and each feature point P may comprise one or more pixel points. A velocity vector is assigned to each pixel point (pixel comprising feature point) in the images to form an image movement field, the image movement field is transferred to a two-dimensional image and represents an optical flow field, and the optical flow field reflects the change trend of gray of each pixel point on the image frame. For continuous image sequence frames, the frame coordinate position of the feature point P on a certain frame can be determined; if the handrail 90 moves, on the next frame adjacent to this frame, a point with the substantially same gray value is searched around the same frame coordinate position and is used as this feature point; and under the situation that the same feature point P on the two adjacent frames 231a and 231b is determined, the shift under the frame coordinates can be substantially configured, and analogically, the shift of the corresponding feature point between any adjacent frames under the frame coordinates can be determined. It needs to be understood that, if the feature point comprises color information, the feature point may be determined based on the gray value and/or chromatic value and further the shift is determined.

It needs to be stated, the shift not only may include shift size, but also may include shift direction information.

Herein, the time calculation module 242 calculates a time interval between the adjacent image frames 231a and 231b based on an acquisition frequency of the image sequence frame 231.

By taking the adjacent image frames 231a and 231b in FIG. 4 as an example, the image frame 231a and the image frame 231b are, for example, successively acquired by the imaging sensor 230, the time point T1 at which the image frame 231a is acquired is earlier than the time point T2 at which the image frame 231b is acquired, thus the time interval (T2−T1) between the image frame 231a and the image frame 231b mainly depends on the acquisition frequency of the image frame, the higher the acquisition frequency is, the smaller the time interval (T2−T1) is, and thus the time interval (T2−T1) can be directly calculated through the acquisition frequency of the image sequence frame 231.

FIG. 4 exemplarily illustrates a plurality of feature points P1, P2 and P3 in the image frame 231a and the image frame 231b, wherein the pixel point which is correspondingly highlighted in the surface 91 of the handrail 90 in the image frame 231 may be selected as the feature point P, e.g., detailed features such as convex points or concave points on the surface 91 can be relatively easily captured under the situation that the imaging sensor 230 performs imaging from a short distance by using the feature that the surface 91 of the handrail 90 has certain roughness, and thus the feature points P are selected to correspond to the convex points and concave points on the surface 91 of the handrail 90. Continuously in view of the feature that the imaging sensor 230 performs imaging from a short distance, feature points P such as convex points or concave points in the image frames 231a and 231b may be rapidly captured during image processing performed by the image processing part 240, coordinate information of the feature points P under the frame coordinates is acquired, e.g., coordinate information of feature points P1, P2 and P3 in the image frame 231a is respectively (x1, y1), (x2, y2) and (x3, y3), and coordinate information of corresponding feature points P1, P2 and P3 in the image frame 231a is respectively (x1', y1), (x2', y2) and (x3', y3) (supposing that the handrail 90 only moves in corresponding direction X illustrated in FIG. 3 at this moment, i.e., a movement component in corresponding direction Y is 0), and thus, corresponding to each feature point, subtraction is performed to the coordinate information thereof to calculate the shift of each feature point under the frame coordinates, and the shifts of the feature points P1, P2 and P3 under the frame coordinates may be respectively expressed as (x1'−x1), (x2'−x2) and (x2'−x2).

It needs to be stated that the number of the feature points P in the adjacent image frames 231a and 231b is not restrictive, and the above-mentioned calculation process can be realized by correspondingly acquiring at least one feature point P from the adjacent image frames 231a and 231b.

Further, the speed calculation module 243 calculates speed information which reflects running speed of the handrail 90 based on the shift obtained by the optical flow estimation module 241 and the time interval obtained by the time calculation module 242.

Exemplarily, continuously as illustrated in FIG. 4, the speed calculation module 243 calculates the speed information of the handrail 90 according to the following relations (1-1) to (1-4) based on the time interval (T2_31 T1) obtained by the time calculation module 242, and the shifts (x1'−x1), (x2'−x2) and (x2'−x2) of the feature points P1, P2 and P3 under the frame coordinates obtained through processing by the optical flow estimation module 241 in the above-mentioned exemplary description:

$$V_{P1}=(x1'-x1)/(T2-T1) \qquad (1\text{-}1)$$

$$V_{P2}=(x2'-x2)/(T2-T1) \qquad (1\text{-}2)$$

$$V_{P3}=(x3'-x3)/(T2-T1) \qquad (1\text{-}3)$$

$$V_{aver}=(V_{P1}+V_{P2}+V_{P3})/3 \qquad (1\text{-}4)$$

where $V_{P1}$, $V_{P2}$ and $V_{P3}$ respectively express speed of feature points P1, P2 and P3 under frame coordinates, and $V_{aver}$ is average value of $V_{P1}$, $V_{P2}$ and $V_{P3}$, expresses speed information of handrail 90 under frame coordinates, and can reflect running speed information of handrail 90 (i.e., speed information of handrail 90 under two-dimensional coordinates).

In an alternative embodiment, in order to decrease the calculation workload of the speed calculation module 243 and improve the detection speed, the speed calculation module 243 does not further calculate the actual running speed of the handrail 90 (i.e., the speed information of the handrail 90 under two-dimensional coordinates) based on the current speed information $V_{aver}$ under the frame coordinates; and specifically, the speed calculation module 243 is further constructed to: calculate reference speed $V_{aver1}$ under the frame coordinates in advance under a reference speed condition of the handrail 90, wherein the reference speed condition may be configured according to the predetermined normal running speed of the handrail 90, the specific calculation process of the reference speed $V_{aver1}$ is substantially the same as the calculation process of the speed information $V_{aver}$ described above, and the calculated reference speed $V_{aver1}$ may be stored in the image processing part 240 in advance; calculate actual speed $V_{aver2}$ under the frame coordinates during daily speed detection of the handrail 90, wherein the calculation process of the actual speed $V_{aver2}$ is substantially the same as the calculation process of the speed information $V_{aver}$ described above; compare the actual speed $V_{aver2}$ with the reference speed $V_{aver1}$ to calculate speed information V which reflects a deviation of the running speed of the handrail 90 relative to the reference speed $V_{aver1}$.

Herein, the comparison and calculation process is specifically as follow:

$$V=100\%*(V_{aver2}-V_{aver1})/V_{aver1} \quad (1\text{-}5)$$

In this way, the obtained speed information V is a percentage numerical value and can reflect the deviation of the current running speed of the handrail 90 relative to the reference speed; if the speed information V is greater than 0, it indicates that the current running speed of the handrail 90 is faster than the reference speed; if the speed information V is smaller than 0, it indicates that the current running speed of the handrail 90 is slower than the reference speed; and if the speed information V is substantially equal to 0, it indicates that the handrail 90 normally runs at the reference speed. Predetermined range values of the speed information V may be defined, and when the predetermined range values are exceeded, the speed calculation module 243 or the imaging processing part 240 gives out a sound alarm.

Therefore, the speed detection device 20 in the above-mentioned embodiments images the local area of the surface 91 of the moving handrail 90 from a short distance, the images are clear, the imaging is not interference by the running environment, the calculation processing amount of the image processing part 240 is decreased (e.g., interference caused by other objects except the handrail 90 does not exist in the image frame 231, and foreground objects do not need to be removed), the speed detection feedback speed is fast, the cost is low and the speed detection of the handrail 90 is accurate.

Moreover, it is acceptable that the speed detection device 20 is installed at a short distance to the surface 91 of the handrail 90, such that it can be installed outside the passenger conveyor 90, the installation is convenient to perform and the maintenance is also very convenient to perform. Therefore, in one embodiment, as illustrated in FIG. 1, the speed detection device 20 is fixedly installed outside the passenger conveyor 100, and specifically is fixedly installed at a handrail entrance 901 of the passenger conveyor 100. During installation, the speed detection device 20 can face to the surface 91 of the handrail 90 and is installed approximately in parallel with the surface 91 of the handrail 90.

Figure 5:
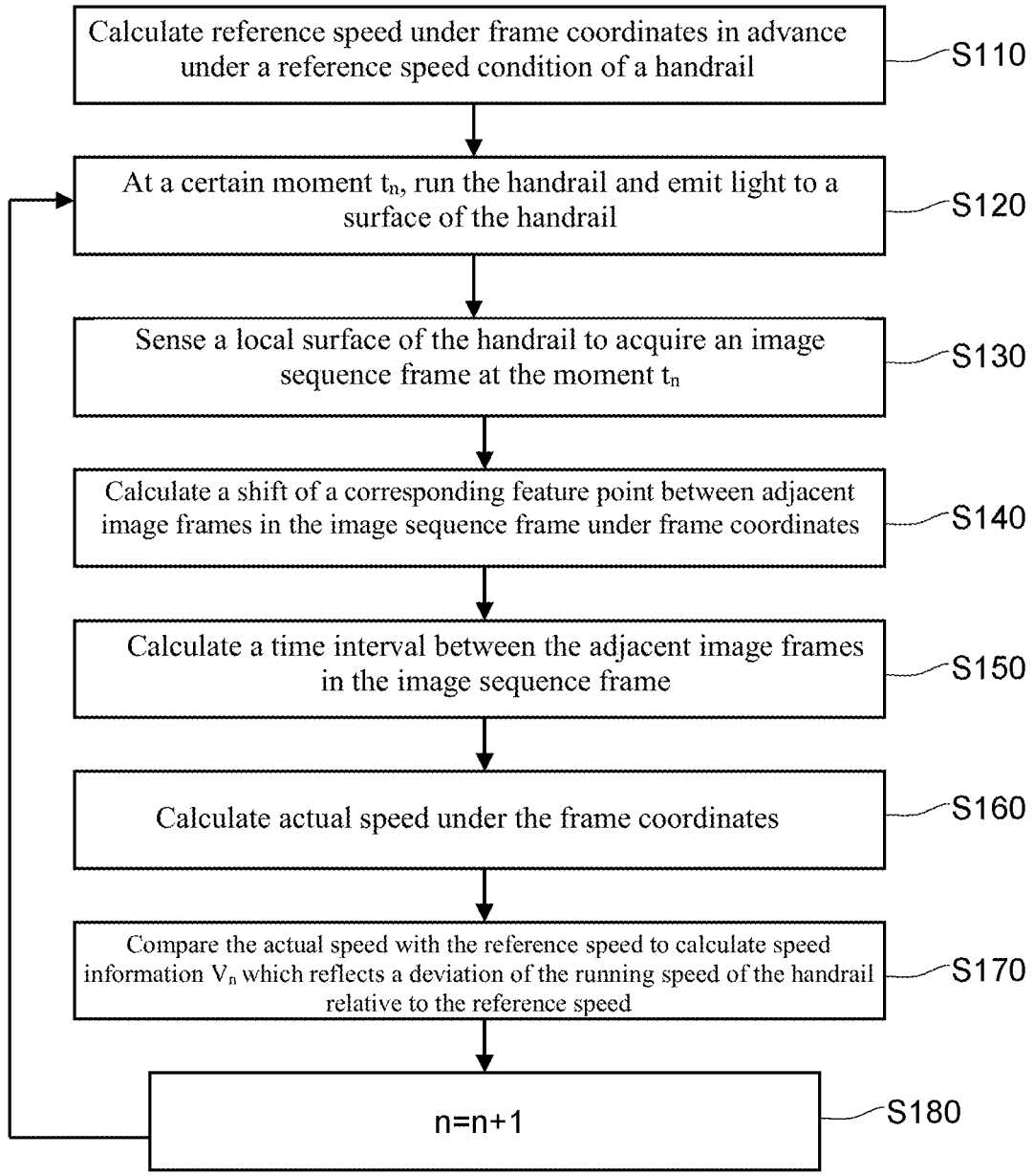
FIG. 5 illustrates a flowchart of a speed detection method for a handrail of a passenger conveyor according to one embodiment of the present invention.

FIG. 5 illustrates a flowchart of a speed detection method for a handrail of a passenger conveyor according to one embodiment of the present invention. The speed detection method using the speed detection device 20 provided by the embodiment of the present invention will be exemplarily described with reference to FIG. 2, FIG. 4 and FIG. 5.

Firstly, in step S110, reference speed $V_{aver1}$ under frame coordinates is calculated in advance under a reference speed condition of a handrail 90, wherein the reference speed condition may be configured according to the predetermined normal running speed of the handrail 90, the specific calculation process of the reference speed $V_{aver1}$ is substantially the same as the calculation process of the speed information $V_{aver}$ described above, and the calculated reference speed $V_{aver1}$ may be stored in an image processing part 240 in advance.

Further, in step S120, at a certain moment $t_n$, the handrail 90 runs, light 211 is emitted to a surface 91 of the handrail 90, and at this moment a preparation is made to detect actual running speed of the handrail 90 at the moment $t_n$, wherein n expresses time point.

Further, in step S130, a local surface 91 of the handrail 90 is sensed to acquire an image sequence frame 231 corresponds to the moment $t_n$, which, for example, comprises adjacent image frames 231a and 231b.

Further, in step S140, a shift of a corresponding feature point between adjacent image frames 231a and 231b in the image sequence frame 231 under frame coordinates is calculated.

Exemplarily, FIG. 4 exemplarily illustrates a plurality of feature points P1, P2 and P3 in the image frame 231a and the image frame 231b, wherein the pixel point which is correspondingly highlighted in the surface 91 of the handrail 90 in the image frame 231 may be selected as the feature point P, e.g., detailed features such as convex points or concave points on the surface 91 can be relatively easily captured under the situation that the imaging sensor 230 performs imaging from a short distance by using the feature that the surface 91 of the handrail 90 has certain roughness, and thus the feature points P are selected to correspond to the convex points and concave points on the surface 91 of the handrail 90. Continuously in view of the feature that the imaging sensor 230 performs imaging from a short distance, feature points P such as convex points or concave points in the image frames 231a and 231b may be rapidly captured during image processing performed by the image processing part 240, coordinate information of the feature points P under the frame coordinates is acquired, e.g., coordinate information of feature points P1, P2 and P3 in the image frame 231a is respectively (x1, y1), (x2, y2) and (x3, y3), and coordinate information of corresponding feature points P1, P2 and P3 in the image frame 231a is respectively (x1', y1), (x2', y2) and (x3', y3) (supposing that the handrail 90 only moves in corresponding direction X illustrated in FIG. 3 at this moment, i.e., a movement component in corresponding direction Y is 0), and thus, corresponding to each feature point, subtraction is performed to the coordinate information thereof to calculate the shift of each feature point under the frame coordinates, and the shifts of the feature points P1, P2 and P3 under the frame coordinates may be respectively expressed as (x1'−x1), (x2'−x2) and (x2'−x2).

Further, in step S150, a time interval between the adjacent image frames 231a and 231b in the image sequence frame is calculated. By taking the adjacent image frames 231a and 231b in FIG. 4 as an example, the image frame 231a and the image frame 231b are, for example, successively acquired by the imaging sensor 230, the time point T1 at which the image frame 231a is acquired is earlier than the time point T2 at which the image frame 231b is acquired, thus the time interval (T2−T1) between the image frame 231a and the image frame 231b mainly depends on the acquisition frequency of the image frame, the higher the acquisition frequency is, the smaller the time interval (T2−T1) is, and thus the time interval (T2−T1) can be directly calculated through the acquisition frequency of the image sequence frame 231.

Further, in step S160, actual speed $V_{aver2}$ under the frame coordinates is calculated.

As illustrated in FIG. 4, the speed calculation module 243 calculates the speed information of the handrail 90 according to the following relations (1-1) to (1-4) based on the time interval (T2−T1) obtained by the time calculation module 242, and the shifts (x1'−x1), (x2'−x2) and (x2'−x2) of the feature points P1, P2 and P3 under the frame coordinates obtained through processing by the optical flow estimation module 241 in the above-mentioned exemplary description:

$$V_{P1}=(x1'-x1)/(T2-T1) \quad (1\text{-}1)$$

$$V_{P2}=(x2'-x2)/(T2-T1) \quad (1\text{-}2)$$

$$V_{P3}=(x3'-x3)/(T2-T1) \quad (1\text{-}3)$$

$$V_{aver2}=(V_{P1}+V_{P2}+V_{P3})/3 \quad (1\text{-}4)$$

where $V_{P1}$, $V_{P2}$ and $V_{P3}$ respectively express speed of feature points P1, P2 and P3 under frame coordinates, and $V_{aver}$ is average value of $V_{P1}$, $V_{P2}$ and $V_{P3}$, expresses speed information of handrail 90 under frame coordinates at the moment $t_n$, and can reflect running speed information of handrail 90 (i.e., speed information of handrail 90 under two-dimensional coordinates).

Further, in step S180, the actual speed $V_{aver2}$ is compared with the reference speed $V_{aver1}$ to calculate speed information $V_n$ which reflects a deviation of the running speed of the handrail 90 relative to the reference speed, wherein the comparison and calculation process may be performed according to the following relation (1-5):

$$V_n=100\%*(V_{aver2}-V_{aver1})/V_{aver1} \quad (1\text{-}5)$$

In this way, the obtained speed information $V_n$ is a percentage numerical value and can reflect the deviation of the running speed of the handrail 90 at the current moment $t_n$ relative to the reference speed; if the speed information $V_n$ is greater than 0, it indicates that the current running speed of the handrail 90 at the current moment $t_n$ is faster than the reference speed; if the speed information $V_n$ is smaller than 0, it indicates that the current running speed of the handrail 90 at the current moment $t_n$ is slower than the reference speed; and if the speed information $V_n$ is substantially equal to 0, it indicates that the handrail 90 normally runs at the reference speed. Therefore, the speed information defection of the handrail 90 at the moment $t_n$ is completed, step S180 is executed, n=n+1, and a preparation is made to perform the speed information detection of the handrail 90 at a next moment, and the speed information detection of the handrail 90 at the next moment may be completed by repeating step S120 and step S170.

The above-mentioned speed detection process can be automatically realized, the moment $t_n$ and the moment $t_{n+1}$ may be continuous and may also be discontinuous.

The above-mentioned examples mainly describe various speed detection devices and speed detection methods thereof, and passenger conveyors installed with the speed detection devices provided by the embodiments of the present invention. Although some embodiments of the present invention are only described herein, one skilled in the art shall understand that the present invention may be implemented by many other means without departing from the essence and scope of the present invention. Therefore, the presented examples and embodiments are considered as schematic rather than restrictive, and the present invention possibly covers various amendments and replacements without departing the spirit and scope of the present invention as defined by the attached claims.

What is claimed is:

1. A speed detection device for a handrail of a passenger conveyor, wherein a distance (D) from the speed detection device to a surface of the detected handrail is centimeter-scale or below centimeter-scale, wherein the speed detection device comprises:

a light source part used for emitting light to the surface of the handrail;

an imaging sensor used for sensing the local surface of the handrail to acquire an image sequence frame; and an image processing part used for analyzing and processing the image sequence frame to obtain speed information of the handrail;

wherein the speed detection device is fixedly installed outside the passenger conveyor and at a handrail entrance of the passenger conveyor.

2. The speed detection device according to claim 1, wherein the speed detection device further comprises a light guide part used for performing path guiding to light emitted by the light source part to form light which irradiates the surface of the handrail approximately in parallel.

3. The speed detection device according to claim 2, wherein the light guide part includes a prism or a lens.

4. The speed detection device according to claim 1, wherein the distance (D) is greater than or equal to 5 mm and is smaller than or equal to 3 cm.

5. The speed detection device according to claim 1, wherein a frequency range that the imaging sensor acquires the image sequence frame is 30 Hz-9,000 Hz.

6. The speed detection device according to claim 1, wherein the light source part includes a light-emitting diode, a laser source or an infrared light source.

7. The speed detection device according to claim 1, wherein the imaging sensor includes a CCD sensor or a CMOS sensor.

8. The speed detection device according to claim 1, wherein the speed detection device faces to the surface of the handrail and is installed approximately in parallel with the surface of the handrail.

9. A passenger conveyor, wherein the passenger conveyor comprises:

handrails; and the speed detection devices according to claim 1 used for performing speed detection to the handrails.

10. A speed detection device for a handrail of a passenger conveyor, wherein a distance (D) from the speed detection device to a surface of the detected handrail is centimeter-scale or below centimeter-scale, wherein the speed detection device comprises:

a light source part used for emitting light to the surface of the handrail;

an imaging sensor used for sensing the local surface of the handrail to acquire an image sequence frame; and an image processing part used for analyzing and processing the image sequence frame to obtain speed information of the handrail;

wherein the image processing part comprises:

an optical flow estimation module used for calculating a shift of a corresponding feature point (P) between adjacent image frames in the image sequence frame under frame coordinates based on an optical flow method;

a time calculation module used for calculating a time interval between the adjacent image frames based on an acquisition frequency of the image sequence frame; and a speed calculation module used for calculating speed information which reflects running speed of the handrail based on the shift and the time interval.

11. The speed detection device according to claim 10, wherein the feature point (P) corresponds to a convex point or a concave point on the surface of the handrail.

12. The speed detection device according to claim 10, wherein the speed calculation module is further configured to:
- calculate reference speed under the frame coordinates in advance under a reference speed condition of the handrail;
- calculate actual speed under the frame coordinates during daily speed detection of the handrail; and
- compare the actual speed with the reference speed to calculate speed information which reflects a deviation of the running speed of the handrail relative to the reference speed.

13. A speed detection method using a speed detection device for a handrail of a passenger conveyor, wherein the speed detection method comprises:
- providing the speed detection device is fixedly installed outside the passenger conveyor and at a handrail entrance of the passenger conveyor;
- when light is emitted to a surface of the handrail from a short distance, sensing the local surface of the handrail from a short distance to acquire an image sequence frame, wherein the short distance refers to that a distance to the surface of the detected handrail is centimeter-scale or below centimeter-scale; and
- analyzing and processing the image sequence frame to obtain speed information of the handrail.

14. The speed detection method according to claim 13, wherein, in the acquiring the image sequence frame, the image sequence frame is acquired based on frequency greater than or equal to 30 Hz and smaller than or equal to 9,000 Hz.

15. The speed detection method according to claim 13, wherein, in a process that the light is emitted to the surface of the handrail, performing path guiding to light to form light which irradiates the surface of the handrail approximately in parallel.

16. A speed detection method using a speed detection device for a handrail of a passenger conveyor, wherein the speed detection method comprises:
- when light is emitted to a surface of the handrail from a short distance, sensing the local surface of the handrail from a short distance to acquire an image sequence frame, wherein the short distance refers to that a distance to the surface of the detected handrail is centimeter-scale or below centimeter-scale; and
- analyzing and processing the image sequence frame to obtain speed information of the handrail;
- wherein the step of analyzing and processing the image sequence frame comprises:
- calculating a shift of a corresponding feature point (P) between adjacent image frames in the image sequence frame under frame coordinates based on an optical flow method;
- calculating a time interval between the adjacent image frames based on an acquisition frequency of the image sequence frame; and
- calculating speed information which reflects running speed of the handrail based on the shift and the time interval.

17. The speed detection method according to claim 16, wherein the speed detection method further comprises:
- calculating reference speed under the frame coordinates in advance under a reference speed condition of the handrail; and
- the calculating the speed information comprises:
- calculating actual speed under the frame coordinates during daily speed detection of the handrail; and
- comparing the actual speed with the reference speed to calculate speed information which reflects a deviation of the running speed of the handrail relative to the reference speed.

18. The speed detection method according to claim 16, wherein the feature point (P) corresponds to a convex point or a concave point on the surface of the handrail.

* * * * *